United States Patent [19]

Bader

[11] Patent Number: 4,890,303

[45] Date of Patent: Dec. 26, 1989

[54] METHOD AND CIRCUIT FOR SYNCHRONIZING A DIGITAL DATA TRANSMISSION SYSTEM WITH A NETWORK-EXTERNAL CLOCK

[75] Inventor: Edgar Bader, Rückersdorf, Fed. Rep. of Germany

[73] Assignee: U.S. Philips Corporation, New York, N.Y.

[21] Appl. No.: 175,639

[22] Filed: Mar. 30, 1988

Related U.S. Application Data

[63] Continuation of Ser. No. 715,231, Mar. 22, 1985, abandoned.

[30] Foreign Application Priority Data

Mar. 20, 1984 [DE] Fed. Rep. of Germany ....... 3410188

[51] Int. Cl.⁴ ............................................. H04L 7/00
[52] U.S. Cl. .................................. 375/107; 370/103; 375/109
[58] Field of Search ............................ 455/51, 69, 71; 375/106, 107, 109, 111; 370/100, 103, 110.1

[56] References Cited

U.S. PATENT DOCUMENTS 3,940,558  2/1976  Gabbard et al. ................... 375/109
4,592,050  5/1986  Bensadon ........................... 375/109

FOREIGN PATENT DOCUMENTS 2146392  3/1973  Fed. Rep. of Germany .
2420437  11/1975 Fed. Rep. of Germany .
2631685  2/1977  Fed. Rep. of Germany .

Primary Examiner—Benedict V. Safourek
Attorney, Agent, or Firm—Algy Tamoshunas; Marianne R. Rich

[57] ABSTRACT

Method and apparatus for synchronizing local clocks at each of two data stations. The first data station is connected through an analog network to an interworking unit. The second data station is connected through an integrated services network having a central clock, to the interworking unit. The interworking unit includes a comparator for comparing the clock phase from the first station transmit clock to the central clock. The result of the comparison is transmitted to the second data station for use in synchronizing the second data station to the first data station.

6 Claims, 3 Drawing Sheets

|   |     |     |     | D0  | D0  | D0  | D1  | S |
|---|-----|-----|-----|-----|-----|-----|-----|---|
| 0 | 0   | 0   | 0   | 0   | 0   | 0   | 0   | 0 |
| 1 | D1  | D1  | D1  | D2  | D2  | D2  | S   |   |
| 1 | D2  | D3  | D3  | D3  | D3  | D4  | X   |   |
| 1 | D4  | D4  | D4  | D5  | D5  | D5  | S   |   |
| 1 | D5  | D6  | D6  | D6  | D6  | D7  | S   |   |
| 1 | E   | E   | E   | E   | E   | E   | E   |   |
| 1 | D7  | D7  | D7  | D8  | D8  | D8  | S   |   |
| 1 | D8  | D9  | D9  | D9  | D9  | D10 | X   |   |
| 1 | D10 | D10 | D10 | D11 | D11 | D11 | S   |   |
| 1 | D11 | D12 | D12 | D12 | D12 | D13 | S   |   |
| 0 | 0   | 0   | 0   | 0   | 0   | 0   | 0   |   |
| 1 | D13 | D13 | D13 | D14 | .   | .   | .   |   |

|   |     |     |     | D1  | D1  | D1  | S |
|---|-----|-----|-----|-----|-----|-----|---|
| 0 | 0   | 0   | 0   | 0   | 0   | 0   | 0 |
| 1 | D1  | D2  | D2  | D2  | D2  | D3  | S |
| 1 | D3  | D3  | D3  | D4  | D4  | D4  | X |
| 1 | D4  | D5  | D5  | D5  | D5  | D6  | S |
| 1 | D6  | D6  | D6  | D7  | D7  | D7  | S |
| 1 | E   | E   | E   | E   | E   | E   | E |
| 1 | D7  | D8  | D8  | D8  | D8  | D9  | S |
| 1 | D9  | D9  | D9  | D10 | D10 | D10 | X |
| 1 | D10 | D11 | D11 | D11 | D11 | D12 | S |
| 1 | D12 | D12 | D12 | D13 | D13 | D13 | S |
| 0 | 0   | 0   | 0   | 0   | 0   | 0   | 0 |
| 1 | D13 | D14 | D14 | .   | .   | .   | . |

FIG.2

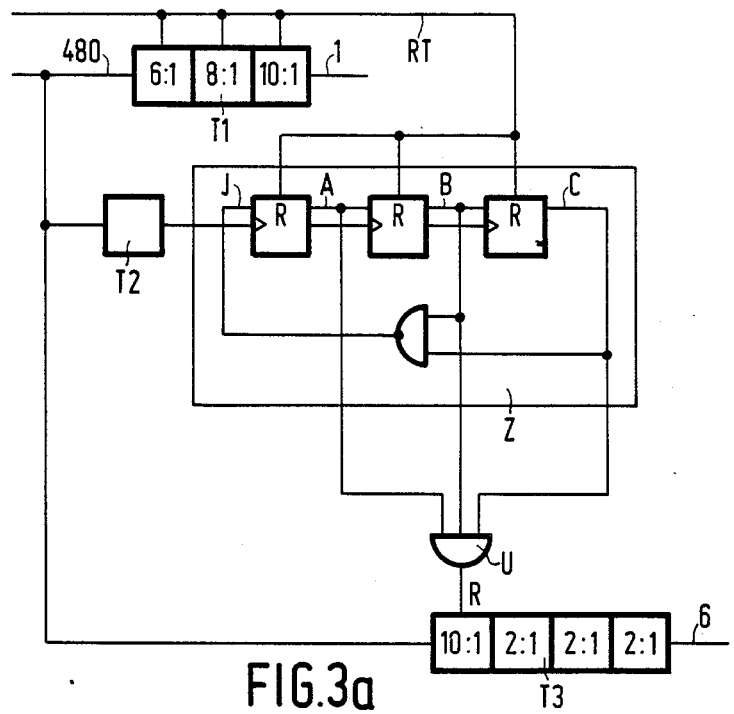
FIG.3a
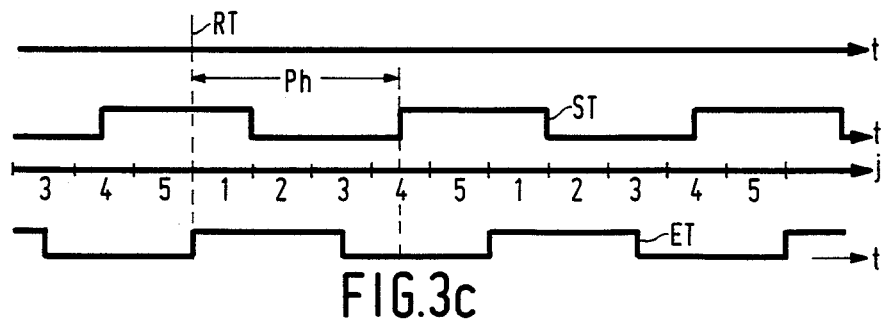
FIG.3b
FIG.3c

METHOD AND CIRCUIT FOR SYNCHRONIZING A DIGITAL DATA TRANSMISSION SYSTEM WITH A NETWORK-EXTERNAL CLOCK

This application is a continiuation of application Ser. No. 715,231, filed Mar. 22, 1985 and now abandoned.

The invention relates to a method of synchronizing a digital transmission system with a network-external clock, the digital terminal equipment within the digital network (ISDN) being in synchronism with the central clock of a clock center of the digital network (ISDN).

When coupling lines to obtain a transmission path via which a clock controlled data transmission is effected, it is necessary for establishing synchronization to derive a receive clock from the data signals transmitted via the lines. The receive clock is used as a transmit clock for the line of each subsequent transmission path section. In this way the synchronism between two consecutive and mutually independently phased path sections can be obtained. If the interconnected path sections are not fixedly coupled connections, but connections which are assembled section by section by optionally coupling different path sections, then when connecting a new connection a different phase position and consequently a very large phase jump, compared with the previous connection, may occur.

To obtain phase compensation, German Patent Application DE-AS 2,146,392 describes a method in which the data signals arriving via a path section are temporarily stored in an intermediate store of an interface unit. To enter the data signals into the store, a write clock derived from the receive clock is used and a read clock derived from the transmit clock is used for data retrieval from the store. To that end, the receive clock pulses determine the write rate for storing and the transmit clock pulses determine the read rate are counted separately, and control criteria are derived from a comparison of these two counting results. With the aid of these control criteria, the receive clock in the receive clock generator is accelerated or delayed. For frequency deviations of a longer duration between the receive and transmit clocks, the extent to which the intermediate store is filled may reach an impermissibly high or an impermissibly low level.

For a synchronous data transmission via telephone lines use is made of so-called modems comprising a clock generator, scrambler, encoder, descrambler, decoder and phase adapter. Using a scrambler, which by way of example may be constituted by a multi-stage shift register, any non-random bit sequence (message) is given a random character by the superposition (modulo-2 addition) of an apparently random bit sequence. Synchronously or asynchronously operating data terminal equipments are connected via modems to the transmission line which is also used for establishing telephone connections. The clock generator of the modems produces the transmit timing clock and the receive timing clock with a frequency accuracy of $10^{-4}$. The clock generator is synchronized with the transitions of the incoming data. If now "0" or "1" sequences of a longer duration quasi-permanent states of the data signal must be transmitted, no transitions from which the timing clock might be derived do occur at the receiver end during this time. With the aid of the scrambler, the data are scrambled at the transmitter end in accordance with a predetermined encoding instruction, so that no quasi-permanent states of longer duration do occur on the transmission line.

When two interconnected modems in the analog telephone network are operated with mutually deviating clock pulses (the permissible frequency deviation amounting to $10^{-4}$) and the bit sequence (message) is transmitted over a longer period of time, then both modems simultaneously transmit the same signal during a plurality of clock periods until on account of the slightly different clock frequencies they diverge again. As a consequence, it is not possible to distinguish between an internal and a external transmit signal and this situation must therefore be prevented by using a corresponding compensating procedure during the synchronisation of the receive clock and the phase adaption. To prevent such echoes from occuring, the line signal at the input of the modem can be combined with a compensating signal produced by an digital-to-analog converter from an 8-bit digital compensating word. At the beginning of the adjusting procedure, a maximum value is taken as the starting point and an error comparator determines whether the sum signal is located symmetrically around the zero line, before the signal is sampled at its instantaneous value three times in each clock period, using a sample-and-hold circuit. The symmetry condition is ensured on each side by the use of the scrambler, which produces a random signal. If there is no symmetry, then the compensating word must be changed stepwise until symmetry has been established. The compensating signal is provided such that it compensates for the instantaneously transmitted bit and also for echoes caused by the four last-transmitted bits. To that end these four bits are intermediately stored in a data store whose content also contributes to producing the compensating word. To enable each bit of the receive signal to be sampled three times for forming the compensation word, a triple rate clock signal must be produced in a clock supply portion. As for an external clock supply this triple rate clock is not available, it must be produced from the single external transmit clock with the aid of a phase control loop.

To accelerate the readjustment in the receiver, the synchronization procedure may be effected in two stages, a coarse synchronization being obtained in the first stage by simultaneously readjusting the clock and carrier phases, any phase change in the receive signal which may occur during the data transmission being removed during the subsequent fine synchronization.

In time-division mulitplex exchanges, the data originating from a synchronous data network must be taken over in the time-division multiplex exchange at a rate determined by their modulation rates and be transmitted at a correspondingly higher rate after switch-through of the data in the time-division multiplex exchange. If at the interface between the time-division multiplex exchange and the data line clocks from different signals, which are plesiochronous to the clock pulse source of the time-division multiplex exchange, come together these clocks must be adapted. German Patent Application DE-AS 2,420,437 discloses a method of adapting the clocks of such plesiochronous signals, according to which the incoming data signals are brought into phase with the clock of the time-division multiplex exchange by means of the line circuit arranged at the input side. At the output side of the time-division multiplex exchange the data to be transmitted are again timed to the correct phase of the clock frame of the time-division multiplex exchange with the aid of a clock whose frequency is equal to that of the clock at the input side is shifted through the fundamental transit time delay of the exchange, whereupon the data are transmitted.

In an integrated services digital network (ISDN) comprising an integrated text and data network (IDN) and an analog public switched telephone network (PSTN) the data lines extend via analog and digital transmission paths. In the digital network the data may be transmitted by means of envelopes containing 8+2 bits and the clock is derived from a clock center arranged in a data exchange.

The clock center has a high clock accuracy with a relative deviation of approximately $10^{-11}$. A means for adapting to a predetermined terminal rate by effecting an automatic bit rate adaption and also an asynchronous-to-synchronous converter means may be provided at the interface. The asynchronous-to-synchronous converter means adapt the binary signals transmitted in a start-stop mode to the synchronous transmission mode in the digital network (for example the integrated text and data network IDN).

The invention has for its object to synchronize a digital data transmission arrangement, which is controlled by a central clock source in the digital network and is in synchronism with the central clock within the digital network, with a network-external clock.

SUMMARY OF THE INVENTION

The measures according to the invention provide the advantage that, to establish synchronization, arrangements already present in the digital network can also be used in establishing this synchronization. From the comparison, during a clock period of the central clock, between the network-external clock and the central clock, a result can be obtained which can be easily evaluated in the digital data transmission system.

In a method according to the invention, no additional transmission channel is required for the transmission of the comparison results and these results are transmitted in the frame in the same way as additional data bits.

The permissible frequency deviation within the analog transmission system amounts to $10^{-4}$. Because of the fact that the comparison can be effected in each period of the frame clock, the control of the receive clock can be effected stepwise by assigning a phase range to the comparison result. Starting from the permissible frequency deviation of $10^{-4}$ of the analog transmission system, in the most disadvantageous case a correction is required only after 20 frames.

In the range of this permissible frequency deviation of $10^{-4}$, it is sufficient to use a 3-bit code for encoding the comparison results. Five of the eight code elements can be utilized for encoding purposes and three code elements for the transmission of justification data.

The circuit arrangement for putting the method according to the invention into effect is of a simple construction, only one additional counter being required for the data station.

The invention will now be described in greater detail by way of example with reference to the accompanying drawings, in which:

DESCRIPTION OF THE FIGURES

FIG. 2 shows the frames used in the method according to the invention for the transmission of comparison results,
and FIG. 3a shows a counter Z used in the data station for regenerating the local clock signal of another data station based on the phase error data received from the ISDN.

FIG. 3b shows how the five contiguous phase ranges which are encoded by the interworking unit.

FIG. 3c illustrates the phase deviation between the transmit clock ST and receive clock ET.

DESCRIPTION OF THE PREFERRED EMBODIMENT

Figure 1:
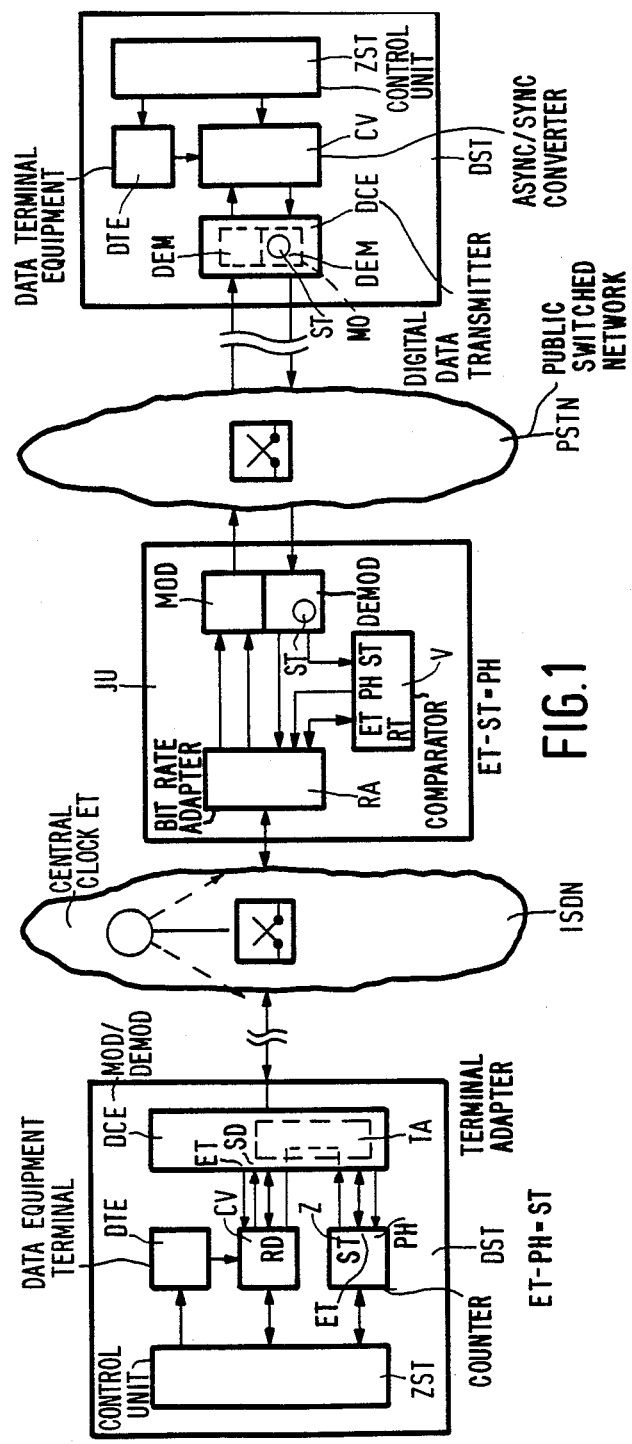
FIG. 1 shows the structure of the digital network.

FIG. 1 shows an integrated services digital network ISDN (digital network) and a public switched telephone network PSTN (analog network). Data stations DST are connected to the integrated services digital network ISDN and to the public switched telephone network PSTN. The data from a digital terminal equipment (data source) DTE are applied in the data station DST to an asynchronous-to-synchronous converter CV. The asynchronous-to-synchronous converter CV is connected to a digital data transmission arrangement DCE (for example, to terminal adaptor TA) and this terminal adaptor is connected to the integrated services digital network ISDN. The asynchronous-to-synchronous converter CV is connected to the public switched telephone network PSTN via a digital data transmission arrangement DCE (comprising for example a modulator MO and a demodulator DEM). The data station DST is provided with a control arrangement ZST not significant for implementing the invention, for processing the data, the spare bits and further additional bits (status bits-user rate identification bits etc.). Data and speech signals are transmitted in the synchronous digital network ISDN as sequences of octets having a bit rate of 64K bit/s.

An interworking unit IU is arranged at the interface between the digital network ISDN and the analog network PSTN. The interworking unit IU comprises a bit rate adaptor RA, a comparator V and also a modulator MO and a demodulator DEM. During a clock period of the central clock ET, the network-external clock (i.e. the transmit clock ST of the modulator MO of the data station DST arranged in the analog network PSTN) is compared with the central clock ET of the clock center of the digital network ISDN with the aid of the comparator V. The comparison results ET-ST are transferred to a counter Z included in the data section DST via the bit rate adaptor RA, the digital network ISDN and the terminal adaptor TA.

The comparison results ET-ST are obtained in each period of the frame clock RT by the apparatus of FIG. 3a and conveyed together with useful data and control information in each of the consecutive frames. In the comparator V a phase range is assigned to the comparison results, i.e. the resultant phase differences, the phase ranges being binary encoded.

FIG. 2 shows the frame such as they are preferably used in the method according to the invention (cf. CCITT Draft Recommendation X.30). As shown in FIG. 2, the transmission is effected by means of groups of eight bits each transmitted as a serial signal, starting more specifically with the upper octet (group of eight bits) in the bit order from left-to-right and from top-to-bottom. The octets comprise bits of the useful information, for example, data spare bits and further additional bits. The additional bits are denoted in the 80 bit frames by S, E and X. Of the additional E bits, the first three bits are used to identify the user rate and the subsequent E bits (spare bits in CCITT Draft Recommendation X.30) are used for transmitting the comparison results. The frame alignment pattern consists of all bits (set to "0" of the upper octet and the first bit (set to "1") of the following consecutive 9 octets of the 80 bit frame.

FIG. 3a shows the counter Z used in the method according to the invention. In the foregoing it was already mentioned that a 3-bit code is used for encoding the comparison results. FIG. 3b shows the encoding of five contiguous phase ranges with five code elements. For the transmission of justification information three code elements are used, a bit having the binary value "0" or "1" being used for positive justification information PST. In the right hand Table of FIG. 3b negative justification information, i.e. the omission of a bit, is indicated by X.

The code counter Z included in the data station DST counts cyclically to five during each clock period of the central clock.

As FIG. 3a and FIG. 3c show, the counter Z is reset at each frame clock RT. In the data station DST the counting position of the counter Z is compared with the comparison result, brought into agreement, and, when there is agreement, the original clock signal ST is regnerated. The data station DST connected to the digital network ISDN is synchronized with the modulator MO of the data station DST connected to the analog network PSTN.

In FIG. 3c the phase deviation between the transmit clock ST and the receive clock ET is indicated by Ph.

What is claimed is:

1. In a data transmission system comprising a first digital data station communicating through an integrated services digital network, interworking unit, and public switched analog network to a second data station, a method for synchronizing local clocks at each of said data stations comprising:
   comparing in said interworking unit the phase of said second station local clock with a central clock associated with said integrated services digital network;
   transmitting the result of said phase comparing over a signalling path to said first digital data station; and,
   regenerating the local clock signal in said first digital data station in accordance with said result and said central clock frequency.

2. A method as claimed in claim 1, wherein the comparison results are transmitted in each one of consecutive frames of the digital integrated service network (ISDN), the frames consisting of a sequence of octets and bytes of said frame being assembled from data bits, and that the comparison results are transmitted in the frame together with useful data and control information.

3. A method as claimed in claim 2, wherein a frame clock (RT) of the digital integrated services network (ISDN) is applied to a comparator (V), and that a comparator (V) determines in each period of the frame clock (RT) the phase difference (Ph) between the central clock (ET) and the second station local clock and assigns a binary encoded phase range to the comparison result.

4. A method as claimed in claim 3, wherein the comparison results are encoded in a three-bit code, and that five code elements are used for encoding five contiguous phase ranges and three code elements are used to transmit justification information.

5. A method as claimed in claim 1, wherein a comparison between the local clock of said second station and the central clock (ET) is effected through a plurality of clock periods of the local clock, further comprising averaging the comparison results obtained during this plurality of clock periods, and utilizing the averaged comparison result for correcting the clock in the first digital data station.

6. A digital data transmission system which synchronizes local clocks of at least two stations, comprising:
   a first data station having a modulator/demodulator with a local transmit clock connected to a local area network;
   an interworking unit having a modulator/demodulator connected to said local area network, a bit rate adapter connected to an integrated services network having a central clock, and a phase comparator comparing the phase of said first data station local transmit clock to said central clock and transmitting the result of said comparison in a data frame over said integrated services network; and
   a second data station connected to said integrated service network for receiving said comparison result, having a counter which counts locally generated clock pulses of a local clock during each clock period of said central clock, and including means to reset said counter at the frame rate of said interworking unit, said counter contents being compared with said comparison result and said locally generated clock pulse being frequency adjusted in accordance with said comparison result to derive from said counter a frequency which is substantially the same as said first station local transmit clock.

* * * * *